US008924547B1

(12) United States Patent
Belk et al.

(10) Patent No.: US 8,924,547 B1
(45) Date of Patent: Dec. 30, 2014

(54) SYSTEMS AND METHODS FOR MANAGING NETWORK DEVICES BASED ON SERVER CAPACITY

(75) Inventors: Robert Randall Belk, Huntsville, AL (US); Robert McCollister Greene, Jr., Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 11 days.

(21) Appl. No.: 13/530,858

(22) Filed: Jun. 22, 2012

(51) Int. Cl.
*G06F 15/173* (2006.01)

(52) U.S. Cl.
USPC ............................. 709/224; 709/203; 709/223

(58) Field of Classification Search
USPC .......................................... 709/224, 223, 203
See application file for complete search history.

(56) References Cited

U.S. PATENT DOCUMENTS

| 2005/0021737 | A1* | 1/2005 | Ellison et al. .................. 709/224 |
| 2005/0047395 | A1* | 3/2005 | Narin et al. ..................... 370/352 |
| 2006/0036743 | A1* | 2/2006 | Deng et al. ..................... 709/227 |
| 2007/0216933 | A1* | 9/2007 | Hirano et al. ................. 358/1.15 |
| 2007/0294380 | A1* | 12/2007 | Natarajan et al. ............. 709/223 |
| 2008/0056142 | A1* | 3/2008 | Arnold et al. .................. 370/248 |
| 2008/0115152 | A1* | 5/2008 | Welingkar et al. ............ 719/322 |
| 2008/0148272 | A1* | 6/2008 | Yoshida ......................... 718/104 |
| 2008/0295103 | A1* | 11/2008 | Shimizu et al. ............... 718/102 |
| 2009/0240547 | A1* | 9/2009 | Fellenstein et al. ............... 705/8 |
| 2009/0292715 | A1* | 11/2009 | Chiaramonte et al. ........ 707/101 |
| 2010/0057828 | A1* | 3/2010 | Hofmann et al. ............. 709/202 |
| 2010/0058349 | A1* | 3/2010 | Diwakar et al. .............. 718/104 |
| 2010/0100877 | A1* | 4/2010 | Greene et al. ..................... 718/1 |
| 2010/0251258 | A1* | 9/2010 | Hanamori et al. ............ 718/105 |
| 2010/0312819 | A1* | 12/2010 | Lipsky et al. ................. 709/202 |
| 2011/0145415 | A1* | 6/2011 | Osaki et al. ................... 709/226 |
| 2011/0167039 | A1* | 7/2011 | Kol et al. ....................... 707/633 |
| 2011/0167112 | A1* | 7/2011 | Mazzucco et al. ............ 709/203 |
| 2012/0011515 | A1* | 1/2012 | Jolfaei et al. .................. 718/103 |
| 2012/0158886 | A1* | 6/2012 | O'Connell et al. ........... 709/217 |
| 2012/0167118 | A1* | 6/2012 | Pingili et al. .................. 719/318 |
| 2012/0218880 | A1* | 8/2012 | Abdel-Kader ................ 370/216 |
| 2013/0047135 | A1* | 2/2013 | Joshi et al. .................... 717/120 |

* cited by examiner

*Primary Examiner* — Waseem Ashraf
(74) *Attorney, Agent, or Firm* — Maynard Cooper & Gale, P. C.; Jon. E. Holland

(57) ABSTRACT

An exemplary network management system comprises a management server communicating with a plurality of network devices via a network. Each network device initiates a check-in request with the management server that indicates a task to be performed by the server. Upon receiving a check-in request from a network device, the management server is configured to determine a task to be performed that requires communication with the network device, and the management server is configured to determine a weight value indicative of a processing burden for the server in performed such task. The management server is further configured to determine whether to perform the task during the current check-in session based on the weight value.

17 Claims, 4 Drawing Sheets

SYSTEMS AND METHODS FOR MANAGING NETWORK DEVICES BASED ON SERVER CAPACITY

RELATED ART

In a conventional network management system, a management server typically contacts a plurality of remote network devices via a network in order to manage the devices. Upon initiating communication with a device, the management server may perform various management functions, such as downloading software or firmware updates or otherwise updating the configuration or operation of the device. However, one or more of the network devices are often located behind firewalls, which can cause problems for the management server, such as preventing the server from establishing communication with such devices. One solution that has been used to avoid problems related to the use of firewalls is allowing the network devices to initiate communication, or "check-in," with the management server. When a network device initiates a communication session with the management server, a firewall protecting the network device allows messages from the management server to pass during the communication session.

However, allowing the network devices to initiate a check-in with the management server creates various other management issues and problems. For example, a large number of the network devices may attempt to check-in simultaneously thereby resulting in congestion at the server and leaving some of the devices unable to check-in once the server reaches capacity. If a device is unable to check-in in a timely manner due to such congestion, a false alarm indicating an operational problem with the network device may be generated. Some techniques attempt to avoid congestion at the management server by randomizing check-in by the network devices. While these and other techniques can help mitigate the problem of congestion in some circumstances, they do not eliminate the possibility of congestion and the associated problems.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods for dynamically managing devices in a network. An exemplary network management system comprises a management server communicating with a plurality of network devices via a network. Each network device comprises logic, referred to herein as "device logic," configured to control the operation of the network device and to initiate a check-in request with the management server, and each check-in request may indicate one or more tasks to be performed by the server. The management server comprises logic, referred to herein as "management logic," that is configured to receive the check-in requests, determine a weight value for each task associated with a check-in request, and to reject tasks that cause the overall weight count for the server to exceed a predefined threshold.

Figure 1:
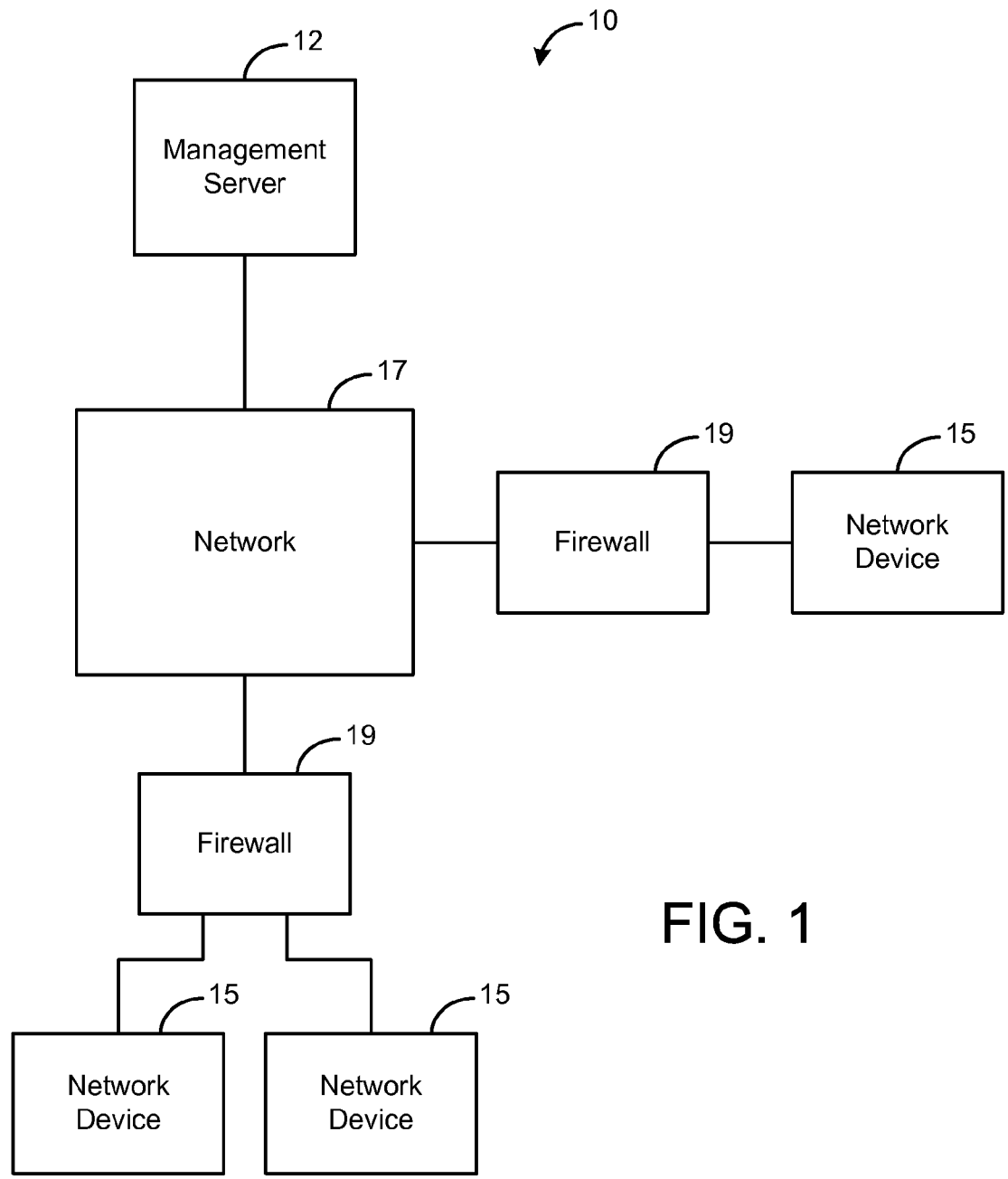
FIG. 1 is a block diagram illustrating an exemplary embodiment of a network management system.

FIG. 1 depicts an exemplary embodiment of a network management system 10 in accordance with the present disclosure. The network management system 10 comprises a management server 12 communicating with a plurality of network devices 15 via a network 17. In one embodiment, the network 17 comprises the Internet, but other types of networks 17 are possible in other embodiments. Three network devices 15 are shown in FIG. 1 for illustrative purposes, but other numbers of network devices 15 are possible in other embodiments.

As shown by FIG. 1, at least one firewall 19 is used to monitor and control network traffic between at least one network device 15 and the network 17. As known in the art, each firewall 19 protects at least one corresponding network device 15 from unauthorized or unwanted communications from the network 17. As an example, each firewall 19 is designed to monitor network traffic in order to protect at least one network device 15 from attacks or malicious communications that could comprise the security of or adversely affect the operation of the network device 15 protected by the firewall 19. The use of firewalls 19 for protecting network devices is generally well-known and will not be described in detail herein. Note that it is possible for a firewall 19 to be connected between the network 19 and at least one network device 19 as shown by FIG. 1, but other configurations are also possible in other embodiments. As an example, it is possible for a firewall 19 to reside on or in the network device 15 that is protected by it.

The management server 12 is configured to manage operations of the network devices 15 and to perform tasks for the devices 15 via the network 17. In one embodiment, the management server 12 performs tasks, such as, for example, distributing firmware updates to the devices 15, rebooting the devices 15, checking the status of the devices, collecting information about the devices 15, and backing up the devices 15 through the network 17, although other tasks are possible in other embodiments.

Each network device 15 is configured to initiate communication with the management server 12 via the network 17. In this regard, each network device 15 transmits a message, referred to herein as a "check-in request," with the server 12 in order to report the status of the device 15 and to request or allow performance of one or more tasks that require communication with the server 12. During the communication session initiated by the network device 15, the server 12 may perform the requested or other tasks, such as tasks that have been scheduled by a network administrator. In one embodiment, the check-in request indicates the type of task to be performed by the server 12. As an example, during one communication session, the server 12 may inform the network device 15 that a task is to be performed, such as a firmware update to the device 15. Later, when the network device 15 checks in with the server 12, thereby initiating another communication session, the device 15 may request performance of the task (e.g., the firmware update), and the server 12 may then perform the requested task. However, in other embodiments, other techniques for initiating a task are possible. As an example, a system administrator may schedule a task to be performed by the server 12 for one or more devices 15, and the server 15 may perform the task for any one of the devices 15 without receiving a request for the task from such device 15.

Note that, in some situations, the firewalls 19 may prevent the management server 12 from initiating communication with such devices 15. As an example, a given firewall 19 may be configured to prevent an unknown source from initiating a communication session with the network device 15 that is protected by it. However, as will be described in more detail hereafter, the check-in request from a particular device 15 creates an opening in the device's firewall 19, thereby allowing the server 12 to communicate with the device 15 through the firewall 19. In one embodiment, each network device 15 is configured to periodically transmit a check-in request to the server 12 in order to report its status and to request performance of tasks by the server 12. As an example, each network device 15 may transmit a check-in request hourly, but different time intervals are possible in other embodiments. Periodic or otherwise repetitive transmissions of a check-in request from a given network device 15 affords the server 12 with opportunities to discover changes to the device's status and from time-to-time to perform tasks that require communication with the network device 15 without interference from the device's firewall 19. In addition, if the server 12 fails to receive a new check-in request from a device 15 within a specified time period from the last check-in request received from such device 15, then the server 12 determines that there is an operational problem associated with the device 15 and, in response, generates an alarm. For example, the server 12 may be configured to transmit a notification to a network administrator indicating that device 15 has failed to check in.

It is possible for multiple network devices 15 to simultaneously transmit check-in requests to the server 12 such that the requested tasks exceed the current capacity of the server 12. Thus, the management server 12 is configured to dynamically manage the load on the server 12 in order to ensure that there is sufficient server capacity to receive and respond to check-in requests. In this regard, for each check-in request received from a given device 15, the server 12 determines which task or tasks are to be performed for the device 15, and the server 12 also determines a value, referred to hereafter as "weight value," indicative of the processing burden at the server 15 to perform such task or tasks. In one exemplary embodiment, a higher weight value indicates a greater processing burden. In other embodiments, other schemes for assigning weight values are possible. The server 15 also determines whether to perform a task for the device 15 during the current communication session with the device 15 based on the weight value corresponding to such task in view of the weight values corresponding to other tasks that are currently being performed by the server 12. If the server 12 determines that there is insufficient server capacity to handle the newly requested task for the device 15 based on the comparison of the weight values, then the server 12 terminates the check-in session without performing the newly requested task, thereby preventing the server 12 from becoming overburdened with tasks related to check-in requests. As a result, the server 12 ensures that it has sufficient capacity to receive and respond to check-in requests from any of the devices 15 at any time, thereby preventing a false alarm that could otherwise occur when a device 15 is unable to check-in due to congestion at the server 12.

For example, in one embodiment, a check-in request from a device 15 requests a particular task to be performed for the device 15 by the server 12, and the server 12 determines a weight for the task indicative of the amount of server capacity required to perform the task. The server 12 also maintains an overall weight count for tasks currently being performed by the server 12. Upon receiving the check-in request, the server 12 determines whether increasing the overall weight count by the weight associated with the requested task will cause the overall weight count to exceed a predefined threshold, as will be discussed in more detail hereafter. If not, the server 12 performs the task during the session initiated by the check-in request. However, if increasing the overall weight count causes it to exceed the threshold, the server 12 terminates such session without performing the requested task. The device 15 later transmits a check-in request requesting the same task after the server 12 has completed one or more tasks and reduced the overall weight count, as will be discussed in more detail hereafter.

Figure 2:
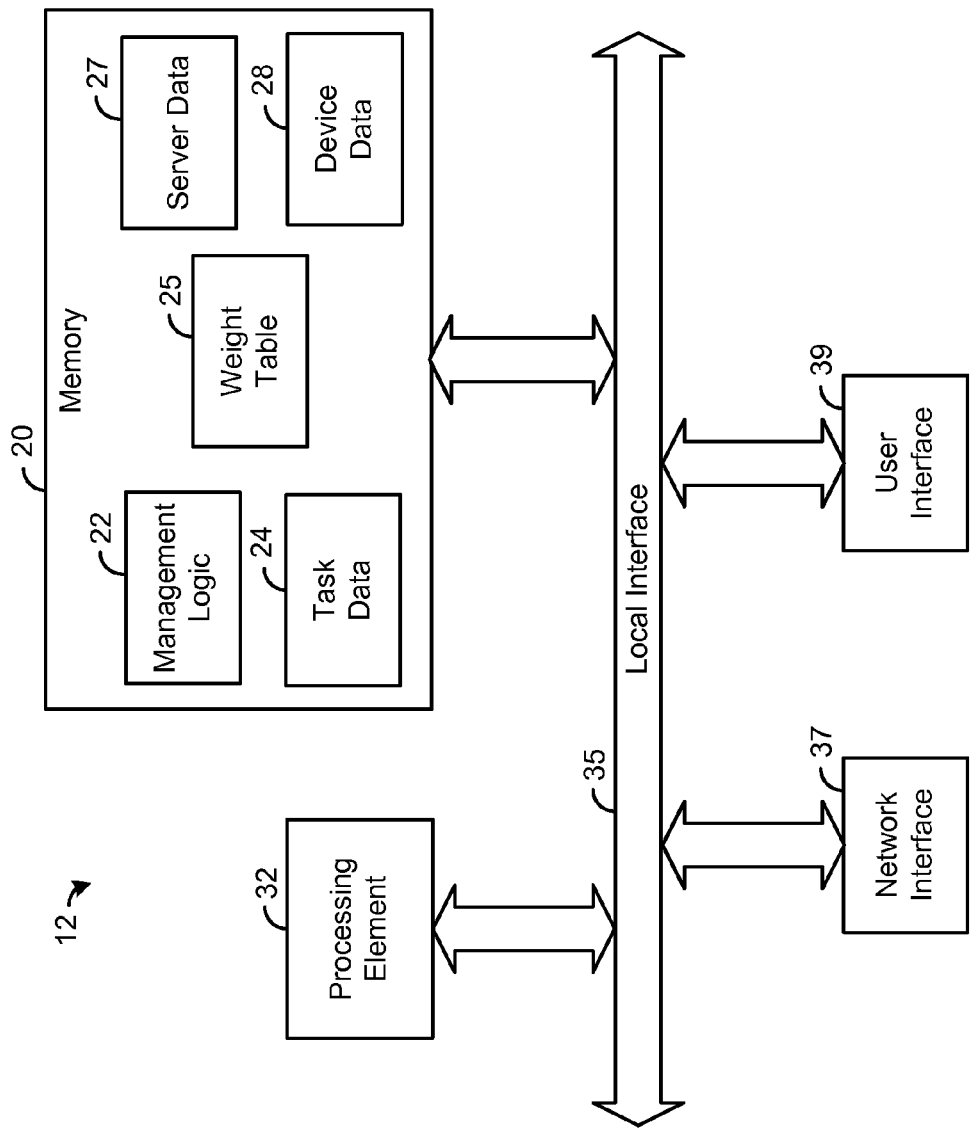
FIG. 2 is a block diagram illustrating an exemplary embodiment of a management server, such as is depicted by FIG. 1.

FIG. 2 depicts an exemplary embodiment of the management server 12 of FIG. 1. In one embodiment, the management server 12 comprises management logic 22 configured to control the operations of the server 12 and to manage the network devices 15 (FIG. 1). In this regard, the management logic 22 is configured to process check-in requests from the network devices 15 and to determine whether to perform tasks associated with the check-in requests based on the current server capacity remaining, as will be discussed in more detail hereafter.

It should be noted that the management logic 22 can be implemented in software, hardware, firmware or any combination thereof. In the exemplary embodiment illustrated in FIG. 2, the management logic 22 is implemented in software and stored in memory 20 of the management server 12.

Note that the management logic 22, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The management server 12 further comprises task data 24, a weight table 25, server data 27, and device data 28 stored in the memory 20. The task data 24 indicates all of the tasks currently being performed by the server 12. The management logic 22 adds an entry to the task data 24 upon accepting a task associated with a check-in request, described in more detail hereafter, and removes an entry from the task data 24 upon completion of such task. The management logic 22 updates the server data 27 to reflect completed tasks, as will be discussed in more detail hereafter.

The weight table 25 indicates a weight value for each type of task to be performed by the server 12. In this regard, each network device 15 indicates in its check-in request the type of task to be performed by the server 12. Upon receiving a check-in request from a network device 15, the management logic 22 accesses the weight table 25 in order to determine the weight value for the task. In one embodiment, each type of task is mapped to a corresponding weight value in the weight table 25, and the corresponding weight value indicates the expected processing burden for the server 12 in performing the task. For example, in one embodiment, the weight table 25 includes a weight value corresponding to status updates, device backups, device reboots, and firmware updates, although different types of tasks are possible in other embodiments. Tasks requiring a relatively large amount of server capacity, such as firmware updates, are assigned a higher weight value than tasks requiring a relatively small amount of server capacity, such as check-in requests or status updates. The logic 22 accesses the weight table 25 to determine the amount of server capacity required to perform a task requested by a check-in request, as indicated by the associated weight value, and accepts or rejects the task based on the weight value and the available server capacity, as will be discussed in more detail hereafter.

The server data 27 indicates information about the server 12, such as, for example, a current overall weight count for the server 12 and a predefined threshold to be compared to the overall weight count. In one exemplary embodiment, such threshold is defined such that, when the overall weight count equals or exceeds the threshold, the server 15 is sufficiently busy performing tasks associated with check-in requests such that it is desirable to accept no new tasks in order to ensure that the server 15 is able to receive and respond to new check-in requests. In other embodiments, the threshold may be set differently based on other factors. In addition, the threshold may be adjusted from time-to-time if desired. For example, to reduce the load on the server 12, the threshold may be reduced. To increase the load on the server 12, the threshold may be increased.

The management logic 22 determines the amount of available server capacity for performing tasks associated with check-in requests based on the overall weight count and the threshold in the server data 27. In this regard, such available server capacity is determined by subtracting the overall weight count from the threshold. Once the management logic 22 determines the weight value for a task newly requested by a check-in request, the management logic 22 accesses the server data 27 in order to determine whether performing the task will cause the overall weight count to exceed the threshold. In one embodiment, the management logic 22 compares the weight value for the newly requested task to the available server capacity to determine whether accepting such task (and, hence, performing the task in the current check-in session) will cause the server 12 to exceed its capacity for performing tasks, as indicated by the threshold. If the weight value for the newly requested task is greater than the available server capacity such that adding such weight value to the overall weight count would cause the overall weight count to exceed the threshold (e.g., there is not sufficient server capacity to perform the task), the management logic 22 rejects the task such that it is not performed by the server 12 at that time. The network device 15 is then instructed to check-in at a later time and the current check-in session is terminated without performing the task, as will be discussed in more detail hereafter.

However, if the weight value for a newly requested task is less than the available server capacity such that adding such weight value to the overall weight count would not cause the overall weight count to exceed the threshold (e.g., there is sufficient server capacity to perform the task), the management logic 22 accepts the task. That is, the management logic 22 adds the task to the task data 24 and performs the task during the current check-in session. The management logic 22 also adds the weight value to the overall weight count in the server data 27 to reflect the additional task being performed by the server 12. The new overall weight count is then used for future check-in requests until one or more tasks ends or another task is accepted.

In this regard, the overall weight count is updated each time a scheduled task, as indicated by the task data 24, ends or a newly requested task is accepted. Accordingly, the overall weight count indicates the current processing burden for performing all tasks that have been accepted but not completed by the management logic 22 or, in other words, all tasks currently being performed by the management logic 22. By accepting tasks that do not result in the overall weight count exceeding the threshold, the management logic 22 ensures that there is sufficient capacity to receive and respond to check-in requests from the devices 15.

The device data 28 indicates various information about each network device 15 coupled to the management server 12 via the network 17. In one embodiment, the device data 28 comprises information indicative of the performance and health about each device 15, but other types of information are possible. For example, if the status of a network device 15 changes, the device 15 is configured to send a check-in request to the server 12 requesting a status update indicative of the changed status, and the logic 22 in the server 12 updates an entry correlated with the device 15 in the device data 28 in order to reflect the current status of the device 15. Furthermore, the logic 22 checks the device data 28 for any tasks scheduled for the device 15, such as, for example, a firmware update scheduled by a system administrator. Thus, the management server 12 maintains status information and desired tasks in the device data 28 for each device 15 in the network management system 10.

The exemplary embodiment of the management server 12 depicted by FIG. 2 comprises at least one conventional processing element 32, such as a digital signal processor (DSP) or a central processing unit (CPU), that communicates to and drives the other elements within the server 12 via a local interface 35, which can include at least one bus. Furthermore, a network interface 37 can be used to communicate with the network 17. Further, and user interface 39, for example, a keyboard, a mouse, and/or a monitor, allows a user to input data into the server 12 and/or allows the logic 22 to output data to the user. In this regard, a user may provide inputs for updating the weight table 25, the server data 27, or the task data 24 via the user interface 39.

Figure 3:
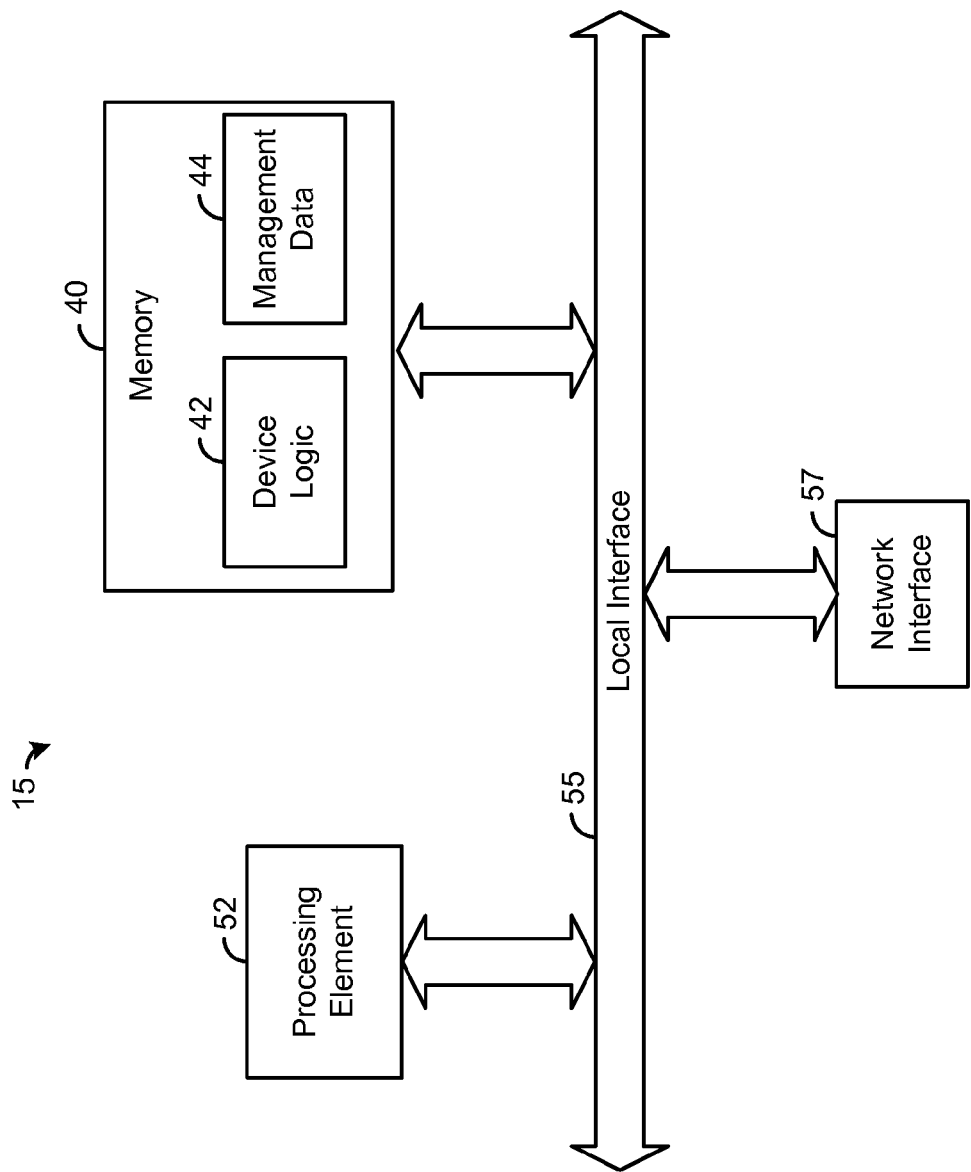
FIG. 3 is a block diagram illustrating an exemplary embodiment of a network device, such as is depicted by FIG. 1.

FIG. 3 depicts an exemplary network device 15. The network device 15 of FIG. 3 comprises device logic 42 configured to control the operation of the network device 15 and to facilitate communication with the management server 12 (FIG. 1). In this regard, the device logic 42 is configured to transmit check-in requests to the server 12 via the network 17 (FIG. 1) and to facilitate tasks performed by the server 12 for the device 15, as will be discussed in more detail hereafter.

It should be noted that the device logic 42 can be implemented in software, hardware, firmware or any combination thereof. In the exemplary embodiment illustrated in FIG. 3, the device logic 42 is implemented in software and stored in memory 40 of the network device 15. Note that the device logic 42, when implemented in software, can be stored and transported on any computer-readable medium for use by or in connection with an instruction execution apparatus that can fetch and execute instructions.

The network device 15 also comprises management data 44 stored in the memory 40. The management data 44 indicates information pertaining to management of the device 15, such as, for example, an address of the server 12 (e.g., an Internet protocol (IP) address), a frequency for sending check-in requests to the server 12, a randomness offset, and server tasks to be performed. In this regard, as set forth above, a check-in request may be transmitted periodically from the device 15 to the server 12 at a predefined interval, and the management data 44 indicates such predefined interval thereby defining the frequency at which the device 15 transmits check-in requests. In one embodiment, the predefined interval is approximately one hour, but different intervals are possible in other embodiments. Note that, in one embodiment, the server address and the predefined interval may be provisioned into the device 15 and may be changed by a system administrator via the management server 12 or otherwise.

Furthermore, information indicative of one or more desired tasks to be performed by the server 12, such as, for example, device reboots, may be stored in the management data 44 and transmitted to the server 12 via one or more check-in requests. In this regard, the device logic 42 determines which tasks to request based on the management data 44 and transmits the check-in request via the network 17. Note that the management data 44 may be updated by the server 12. For example, the server 12 may update the management data 44 to add a task, such as a firmware update, that is to be performed by the server 12. Until a task is completed, the device logic 42 is configured to request the task in each check-in request that is transmitted to the server 12. As indicated above, the tasks may be accepted or rejected depending on server capacity. If a task is rejected such that a check-in session is terminated without performance of the requested task, the device logic 42 requests performance of the task in the next check-in request.

The device logic 42 accesses the randomness offset in the management data 44 in order to determine an offset for the frequency of check-in requests, and the device logic 42 adjusts the frequency at which it transmits check-in requests in accordance with the randomness offset. In this regard, the randomness offset comprises a time value indicating the amount of time that the device 15 should fluctuate from its predefined interval for sending check-in requests. Thus, even if the all of the devices 15 are provisioned to have the same check-in frequency (e.g., 1 hour) and are powered-up at the same time (such as may occur after a power fault), they should nevertheless transmit check-in requests at different times since each has a random offset incorporated into its check-in frequency. Note that the randomness offset may be provisioned by an administrator of the system 10 (FIG. 1), may be randomly generated by the server 12 and transmitted from the server 12 to the device 15, or may be randomly generated by the device logic 42 via an algorithm stored in the data 44.

The exemplary embodiment of the network device 15 depicted by FIG. 3 comprises at least one conventional processing element 52, such as a DSP or a CPU, that communicates to and drives the other elements within the device 15 via a local interface 55, which can include at least one bus. Furthermore, a network interface 57 can be used to communicate with the network 17. For example, messages (e.g., check-in requests) destined for the server 12 are transmitted from the device 15 via the network interface 57, and messages from the server 12 are received by the device 15 via the network interface 57.

As described above with reference to FIG. 1, the network device 15 of FIG. 3 is preferably coupled to a firewall 19 that comprises security features configured to protect the device 15. In at least some cases, the firewall 19 may prevent the server 12 from initiating contact with the network device 15. However, each check-in request transmitted by the device 15 creates an opening in the firewall 19 that enables the server 12 to communicate with the device 15, thereby allowing the server 12 to manage the device 15 and ensure that the device 15 remains up to date.

In this regard, a check-in request includes a network address that identifies the management server 12. As an example, when the network comprises the Internet, a check-in request may be in accordance with transmission control protocol/Internet protocol (TCP/IP) such that the check-in request includes the IP address of the server 12 as the message's destination address. In other embodiments, other protocols and other types of addresses may be used. The firewall 19 is configured to inspect each message that is transmitted from and received by the device 15. In response to the outgoing check-in request, the firewall 19 is configured to add the request's destination address (i.e., the address of the server 12) to an address list, referred to hereafter as "source list," that is maintained by the firewall and is indicative of sources that are permitted to communicate with the device 15. The server address remains in the source list until the session initiated by the check-in request is terminated or until a certain amount of time elapses with without the firewall 19 seeing a message destined for the server 12 or received from the server 12.

When the firewall 19 receives a message from the server 12, it compares the message's source address (which should be the server's IP address) to the source list. If there is a match, the firewall 19 allows the message to pass such that it is received by the device logic 42. Otherwise, the firewall 19 may discard the message such that it is not received by the device logic 42. Thus, transmission of the check-in request enables the server 12 to communicate through the firewall 19 with the device logic 42 in order to perform tasks that require communication with the logic 42. Once the server 12 has performed the tasks for a given check-in session, the server 12 transmits a message, referred to hereafter as an "end-of-session message." In response to such message, the firewall 19 removes the server's address from the source list effectively terminating the check-in session. Later, a new check-in session may be initiated by the device logic 42 transmitting a new check-in request, as described above.

Figure 4:
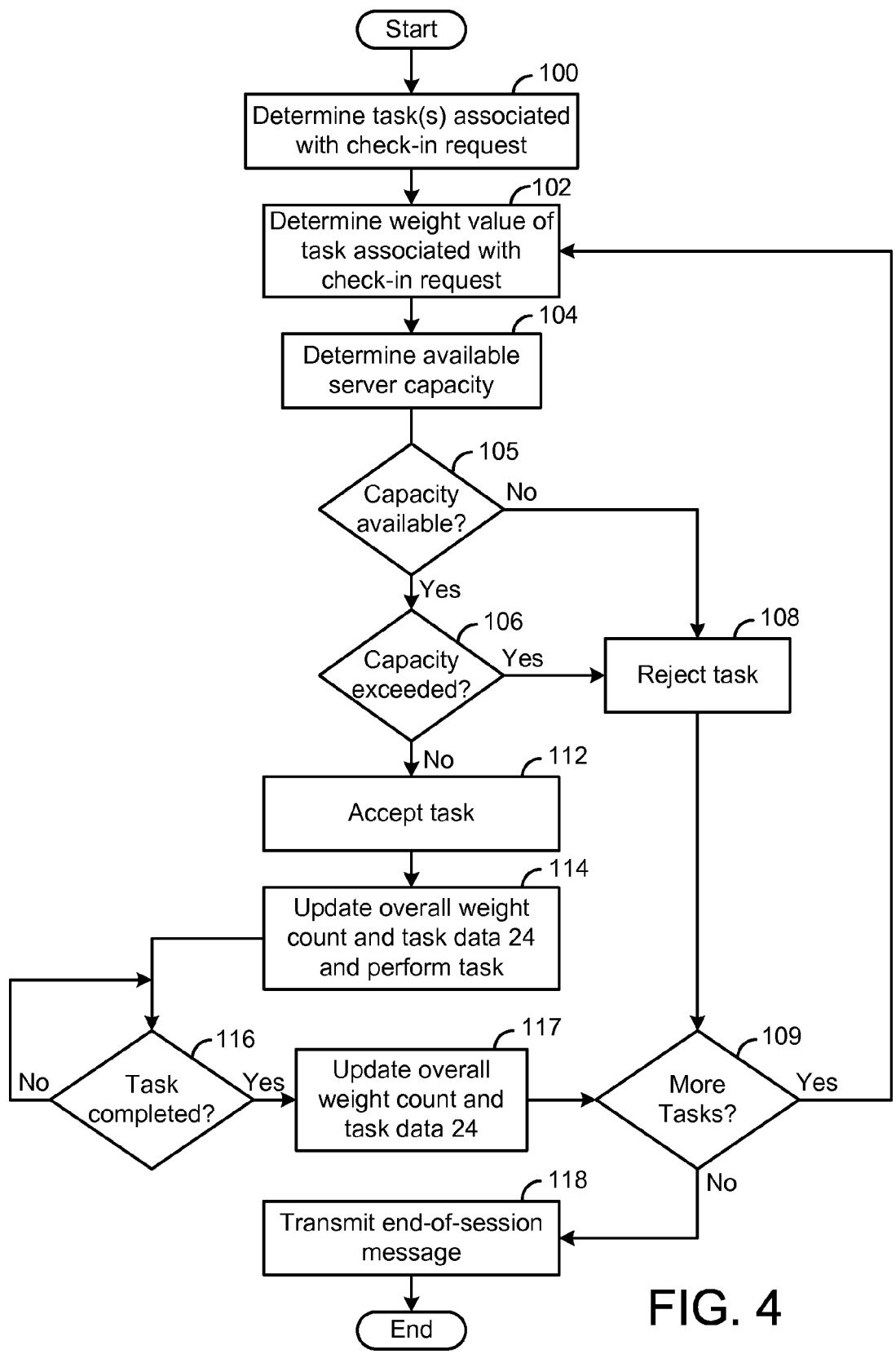
FIG. 4 is a flowchart illustrating an exemplary method for handling a check-in request at a management server, such as is depicted by FIG. 1.

An exemplary operation of the management server 12 in handling a check-in request will now be described in more detail with reference to FIG. 4.

Assume that a network device 15, referred to hereafter as the "requesting device 15," transmits a check-in request to the server 12 via the network 17, and assume that such check-in request requests at least a firmware update of the requesting device 15. Upon receiving the check-in request, the management logic 22 at the server 12 determines each task that is associated with the check-in request, as shown by block 100 of FIG. 4. In the present example, at least a firmware update is indicated by the check-in request. Note that in other examples, the management logic 22 may determine a task associated with the check-in request via other techniques. As an example, a list of tasks to be performed for the requesting device 15 may be stored at the server 12, and the management logic 22 may identify associated task(s) based on such list in response to the check-in request.

After determining a task associated with the check-in request, the server 12 accesses the weight table 25 to determine a weight value for such task, as shown by block 102. In this regard, the management logic 22 in the server 12 looks up an entry in the weight table 25 corresponding to the type of task associated with the task (e.g., firmware update) in order to determine the weight value associated with that type of task.

Upon determining the weight value for the task associated with the check-in request, the management logic 22 determines the available server capacity, as shown by block 104. In this regard, the management logic 22 accesses the overall weight count and the predefined threshold from the server data 27 and subtracts the overall weight count from the threshold to determine the available server capacity. If the overall weight count is less than the threshold, the available server capacity is equal to the difference between the overall weight count and the threshold. However, if the overall weight count is greater than or equal to the threshold, then there is no available server capacity. In such case, the management logic 22 rejects the task, as shown by blocks 105 and 108.

If there is available capacity, the logic 22 compares the weight value of the task associated with the check-in request to the available server capacity to determine whether accepting the check-in request will cause the overall weight count to exceed the threshold, as shown by block 106. In this regard, if the weight value is greater than the value indicative of available server capacity (i.e., the difference between overall weight count and the threshold), then increasing the overall weight count by the weight value would cause the overall weight count to exceed the threshold. In such case, the logic 22 rejects the task, as shown by blocks 106 and 108. If the task is rejected, the management logic 22 determines whether there are any other tasks associated with the check-in request that have yet to be processed for acceptance or rejection, as shown by block 109. If there are no additional tasks, then the management logic 22 transmits an end-of-session message to the requesting device 15, thereby terminating the communication session initiated by the check-in request.

If the weight value is less than the value indicative of available server capacity (i.e., the difference between overall weight count and the threshold), then increasing the overall weight count by the weight value would not cause the overall weight count to exceed the threshold. In such case, the logic 22 accepts the task, as shown by block 112. The weight value of the task is then added to the overall weight count and the task data 24 is updated in order to reflect the additional task being performed by the server 12, as shown by block 114. The management logic 22 also performs the task by communicating with the requesting device 15 in the communication session initiated by the check-in request. Once the task is completed, the management logic 22 subtracts the weight value of the task from the overall weight count, as shown by blocks 116 and 117, and the management logic 22 updates the task data 24 to remove the completed task from such data 24. The management logic 22 also determines whether there are any other tasks associated with the check-in request that have yet to be processed for acceptance or rejection, as shown by block 109. If there are no additional tasks, then the management logic 22 transmits an end-of-session message to the requesting device 15, as shown by block 118, thereby terminating the communication session initiated by the check-in request.

In the process described above, the tasks associated with a given check-in request are performed serially. However, it should be noted that is possible for the server 12 to perform multiple tasks associated with the same check-in request at the same time. That is, it is unnecessary for the management logic 22 to wait for the completion of a task associated with a check-in request before performing another task associated with the same check-in request. Yet other changes and modifications to the exemplary embodiments described are possible and would be apparent to a person of ordinary skill upon reading this disclosure. In addition, it should be noted that the process shown by FIG. 4 can be performed for multiple check-in requests at the same time.

Now, therefore, the following is claimed:

1. A network management system, comprising:
   a management server coupled to a network; and
   a plurality of network devices coupled to the network, the network devices configured to communicate with the management server via the network, the network devices configured to transmit check-in requests to the management server via the network,
   wherein the management server is configured to determine, in response to one of the check-in requests received from one of the network devices during a communication session initiated by the one check-in request, at least one task that requires communication with the one network device, wherein the management server is configured to determine a first weight value indicating an expected processing burden for the management server in performing the one task, wherein the management server is configured to maintain a second weight value indicating an overall processing burden for the management server for each of a plurality of tasks currently being performed by the management server, and wherein the management server is configured to update the second weight value based on the first weight value in response to the one check-in request and to determine whether to perform the one task during the communication session based on a comparison of the second weight value to a predefined threshold.

2. The network management system of claim 1, wherein the management server is configured to determine the second weight value by combining a plurality of weight values, each of the plurality of weight values indicating a respective processing burden for the management server for a task currently being performed by the management server.

3. The network management system of claim 1, wherein the management server is configured to determine the second weight value by summing a plurality of weight values, each of the plurality of weight values indicating a respective processing burden for the management server for a task currently being performed by the management server.

4. A management server, comprising:
   memory for storing weight values, each of the weight values corresponding to a task and indicating an expected processing burden for the management server in performing the corresponding task; and
   logic configured to manage a plurality of network devices of a network and to communicate with each of the network devices via the network, the logic configured to receive a check-in request from one of the network devices during a communication session initiated via the check-in request, the logic further configured to determine in response to the check-in request at least one task that requires communication with the one network device and to determine whether to perform the one task during the communication session, based on the weight value corresponding to the one task and an overall processing burden for the management server for each of a plurality of tasks currently being performed by the management server, such that the logic ensures sufficient capacity at the management server to process check-in requests from each of the plurality of network devices.

5. The management server of claim 4, wherein the logic is configured to compare the weight value corresponding to the one task and a value indicative of the overall processing burden.

6. The management server of claim 5, wherein the logic is configured to determine the value indicative of the overall processing burden by mathematically combining each of the weight values corresponding to a respective one of the plurality of tasks.

7. The management server of claim 5, wherein the logic is configured to determine the value indicative of the overall processing burden by summing each of the weight values corresponding to a respective one of the plurality of tasks.

8. The management server of claim 5, wherein the logic is configured to determine whether increasing the value indicative of the overall processing burden by the weight value causes the value indicative of the overall processing burden to exceed a predefined threshold.

9. A network management method, comprising:
   storing, in memory, a plurality of weight values, each of the weight values corresponding to a task and indicating an expected processing burden for a management server in performing the corresponding task;

communicating between a plurality of network devices and the management server;

receiving a check-in request at the management server during a communication session between the management server and one of the network devices, the communication session initiated by the check-in request;

identifying, in response to the check-in request, at least one task that requires communication with the one network device;

determining whether to perform the one task during the communication session based on the weight value corresponding to the one task and an overall processing burden for the management server for each of a plurality of tasks currently being performed by the management server; and ensuring, based on the determining, that the management server has sufficient capacity to process check-in requests from each of the plurality of network devices.

10. The method of claim 9, further comprising comparing the weight value corresponding to the one task and a value indicative of the overall processing burden, wherein the determining is based on the comparing.

11. The method of claim 10, further comprising determining the value indicative of the overall processing burden by mathematically combining each of the weight values corresponding to a respective one of the plurality of tasks.

12. The method of claim 10, further comprising determining the value indicative of the overall processing burden by summing each of the weight values corresponding to a respective one of the plurality of tasks.

13. The method of claim 9, further comprising initiating an alarm in response to a determination that the management server fails to receive a check-in request from one of the network devices within an expected time period.

14. The network management system of claim 1, wherein the threshold is set such that the management server sufficiently conserves capacity at the management server to process the check-in requests transmitted by the network devices, thereby preventing false alarms associated with the check-in requests.

15. The network management system of claim 14, wherein the management server is configured to initiate an alarm if the network management server fails to receive a check-in request from the one network device within an expected time period.

16. The management server of claim 4, wherein the logic is configured to initiate an alarm when the management server fails to receive a check-in request from one of the network devices within an expected time period.

17. A network management method, comprising:

receiving at a management server a plurality of check-in requests from a plurality of network devices in communication with the management server via a network;

for each of the network devices, storing at the server a list of tasks to be performed by the management server when the management server receives a check-in request from the respective network device;

determining weight values indicative of expected processing burdens for the management server to perform the tasks;

determining a weight value indicative of an overall processing burden for tasks currently being performed by the management server;

initiating an alarm if the network management server fails to receive a check-in request from one of the network devices within an expected time period; and determining whether to perform tasks in response to the check-in requests based on the weight values indicative of the expected processing burdens and the weight value indicative of the overall processing burden such that the management server has sufficient capacity to process each of the check-in requests, thereby preventing false alarms resulting from the initiating.

* * * * *